United States Patent [19]

Milliorn et al.

[11] Patent Number: 4,797,948

[45] Date of Patent: Jan. 10, 1989

[54] VEHICLE IDENTIFICATION TECHNIQUE FOR VEHICLE MONITORING SYSTEM EMPLOYING RF COMMUNICATION

[75] Inventors: Gary W. Milliorn; Steven D. Bromley, both of Austin, Tex.

[73] Assignee: Motorola, Inc., Schaumburg, Ill.

[21] Appl. No.: 76,580

[22] Filed: Jul. 22, 1987

[51] Int. Cl.[4] .......................... H04B 1/00; G08B 5/22

[52] U.S. Cl. ........................................ 455/54; 455/67; 455/99; 379/58; 340/825.47; 340/991

[58] Field of Search ....................... 455/53, 54, 67, 66, 455/33, 99; 379/58, 56; 340/825.47, 48, 991, 992, 994

[56] References Cited

U.S. PATENT DOCUMENTS

| | | | |
|---|---|---|---|
| 3,076,958 | 2/1963 | Pohm | 340/174 |
| 3,524,937 | 8/1970 | Herry et al. | 179/15 |
| 3,531,772 | 9/1970 | Dalyai et al. | 340/163 |
| 3,585,598 | 6/1971 | Hudson, Jr. et al. | 340/172.5 |
| 3,644,883 | 2/1972 | Borman et al. | 340/23 |
| 3,670,275 | 6/1972 | Kalliomaki et al. | 325/370 |
| 3,672,210 | 6/1972 | Cressman et al. | 73/67.9 |
| 3,735,045 | 5/1973 | Clark | 178/69.5 R |
| 4,017,835 | 4/1977 | Randolph | 340/152 R |
| 4,103,288 | 7/1978 | Westman | 340/152 R |
| 4,112,421 | 9/1978 | Freeny, Jr. | 343/112 D |
| 4,198,624 | 4/1980 | Watanabe | 340/505 |
| 4,217,588 | 8/1980 | Freeny, Jr. | 343/112 D |
| 4,251,865 | 2/1981 | Moore et al. | 364/200 |
| 4,298,858 | 11/1981 | Romanski | 340/146.3 |
| 4,411,017 | 10/1983 | Talbot | 455/54 |
| 4,466,001 | 8/1984 | Moore et al. | 340/825.08 |
| 4,476,469 | 10/1984 | Lander | 340/825.49 |
| 4,481,670 | 11/1984 | Freeburg | 455/33 |
| 4,491,838 | 1/1985 | West | 340/825.05 |

*Primary Examiner*—John W. Caldwell, Sr.
*Assistant Examiner*—Tyrone Queen
*Attorney, Agent, or Firm*—Robert J. Crawford

[57] ABSTRACT

In a communication system having a communication channel for transmitting data between a base station and a plurality of mobile radio units, wherein each radio unit has a unique identification (ID) code and wherein transmissions from each radio unit to the base station include the unit's ID code, a method is described for identifying which units are within RF communication proximity of the base station. The method includes: transmitting a range message, including a low ID code parameter and a high ID code parameter, from the base station over the channel to elicit a response from at least one of the mobile radio units having an ID code between the low and high parameters; determining whether radio units transmitted a message in response to the range message; and storing, responsive to transmission by the units, in an ID list a signal representative of the respective ID code assigned to such transmitting units. These steps are repeated with different transmitted range messages until each of the radio units within RF proximity of the base station is appended to the ID list.

16 Claims, 6 Drawing Sheets

VEHICLE IDENTIFICATION TECHNIQUE FOR VEHICLE MONITORING SYSTEM EMPLOYING RF COMMUNICATION

FIELD OF THE INVENTION

The present invention relates generally to the communication systems, and, more particularly, to the identification of vehicles within RF proximity of a base station employing radio wave communcation between the base station and a plurality of mobile radio units each installed in an associated vehicle.

DESCRIPTION OF THE PRIOR ART

The present invention has particular application to vehiclre recording systems. Vehicle recording systems employ vehicle recording devices respectively installed in vehicles and a central data center which is used at the vehicle docking yard for analysis of data recorded by the recording devices. The systems are useful for a variety of applications pertaining to both operator and vehicle communication and control. In regard to the vehicle operator, a vehicle recording device may be used to log such items as the operator's driving time, trip time and stopping time for meals. In regard to the vehicle itself, the recording device may be used to record fuel efficiency on a trip basis, engine temperature parameters and other related information. This information is typically recorded while the vehicle is traveling, i.e. some distance from its designated docking yard, and analyzed once the vehicle returns to the docking yard.

Previous implementations of such recording systems have failed to effectuate convenient control and access to the recording devices. For example, a delivery business docking yard will typically experience the oncoming of an entire fleet of delivery trucks. These trucks will have recorded in their respective vehicle devices an entire data bank of information which must be transfered to the centralo data center for management and analysis of such data. Such data transfers have been previouly accomplished through the burdensome technique of alternately connecting a cable, connected at one end to the central data bank, from one vehicle monitor device to the next. This communication is sequential. Its path, from the central data bank to each device, is through the cable.

RF communication systems have been employed, however, for transferring data from a plurality of mobile radio units to a central data center on a single communications channel. Such systems have attempted to overcome the inherent problem of inefficient communication over the single communication channel. For instance, U.S. Pat. No. 4,251,865, assigned to the assignee of the instant invention, a polling communication technique is described wherein a base station controller individually queries each mobile unit (using its mobile identification code) to determine their presence, but prioritizes the polling order depending on how recently the mobile units have communicated with the central data center. Although this queuing scheme increases the efficiency of the single channel polling usage, its application to the vehicle monitoring arrangement described above has limited application.

This limitation is a function of the polling manner employed for identifying the presence of the mobile radio units. The polling technique described requires a fixed and known list of mobile identification code's. This technique is not practical for many systems because the technique cannot identify mobiles which are new to the system.

In other systems, the problem of inefficient communication on the single channel is overcome by utilizing a plurality of base stations situated so as to provide nonoverlapping zones (cells), thereby allowing more mobile units to communicate throughout the system by increasing the number of units that may communicate simultaneously. In such systems, the mobile units are polled individually to determine their presence. Unfortunately, the cost of such a system is impracticable for most vehicle monitoring system applications.

Accordingly, there is a need for a communication system which overcomes the above mentioned shortcomings.

OBJECTS AND BRIEF SUMMARY OF THE INVENTION

It is a general object of the present invention to provide a system which overcomes the above mentioned shortcomings.

It is a more specific object of the present invention to provide a low cost communication system which cn promptly identify any number of vehicles within RF communication range of a base station using a single communications channel, yet reduce tying up the channel during such identification.

It is an additional object of the present invention to provide such a communication system which can accurately identify such vehicles in the presence of varying levels of radio frequency noise.

The present invention may briefly be described in terms of a preferred embodiment involving a communication system having a communication channel for transmitting data between a base station and a plurality of mobile radio units, wherein each radio unit has a unique associated identification (ID) code and wherein transmissions from each radio unit to the base station include the unit's ID code. The base station employs the following technique to identify which units are within RF communication proximity of the base station. First, a range message, including a low ID code parameter and a high ID code parameter, is transmitted from the base station over the channel to elicit a response from any in-range mobile radio units having an ID code between the low and high code parameters. Second, the base station employs a searching strategy to determine whether any radio units transmitted a message in response to the range message. Finally, in response to the transmission by any radio units, a signal representative of the respective ID code assigned to such transmitting units is stored in an ID list to indicate that the particular radio unit has been identified.

Preferably, after the initial range message is transmitted by the base station (to elicit responses from the radio units), the particular searching strategy employed by the base station comprises the following steps. First, the base station determines if a plurality of radio units appeared to have responded to the range message. Second, responsive to "apparent" multiple radio unit responses, the base station transmits another range message having a new ID range in order to selectively limit the number of apparent responses from the radio units. Third, the base station determines when only one radio unit responds to the most recently transmitted range message. Fourth, in the absence of any radio unit responding to the most recently transmitted range message, the previous two steps are repeated, until it is determined that only one unit has responded. Once any single radio unit is identified, its ID code parameter is stored, and the single responding unit is instructed by the base station to temporarily not respond to further range messages. Beginning at the second step, these steps are repeated until no more radio units respond to the most recently transmitted range message.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in which like reference numerals identify like elements, and wherein:

DETAILED DESCRIPTION OF THE PREFERRED EMBODIMENT

The system disclosed in this specification has particular use for the location of vehicles in a communication system. More particularly, this system has applicability for the location of vehicles in a radio wave communication system for single channel communication between a base station and a plurality of mobile radio units, the latter of which are respectively installed in vehicles and coupled to a vehicle monitoring device which monitors and records data associated with the vehicle.

Figure 1:
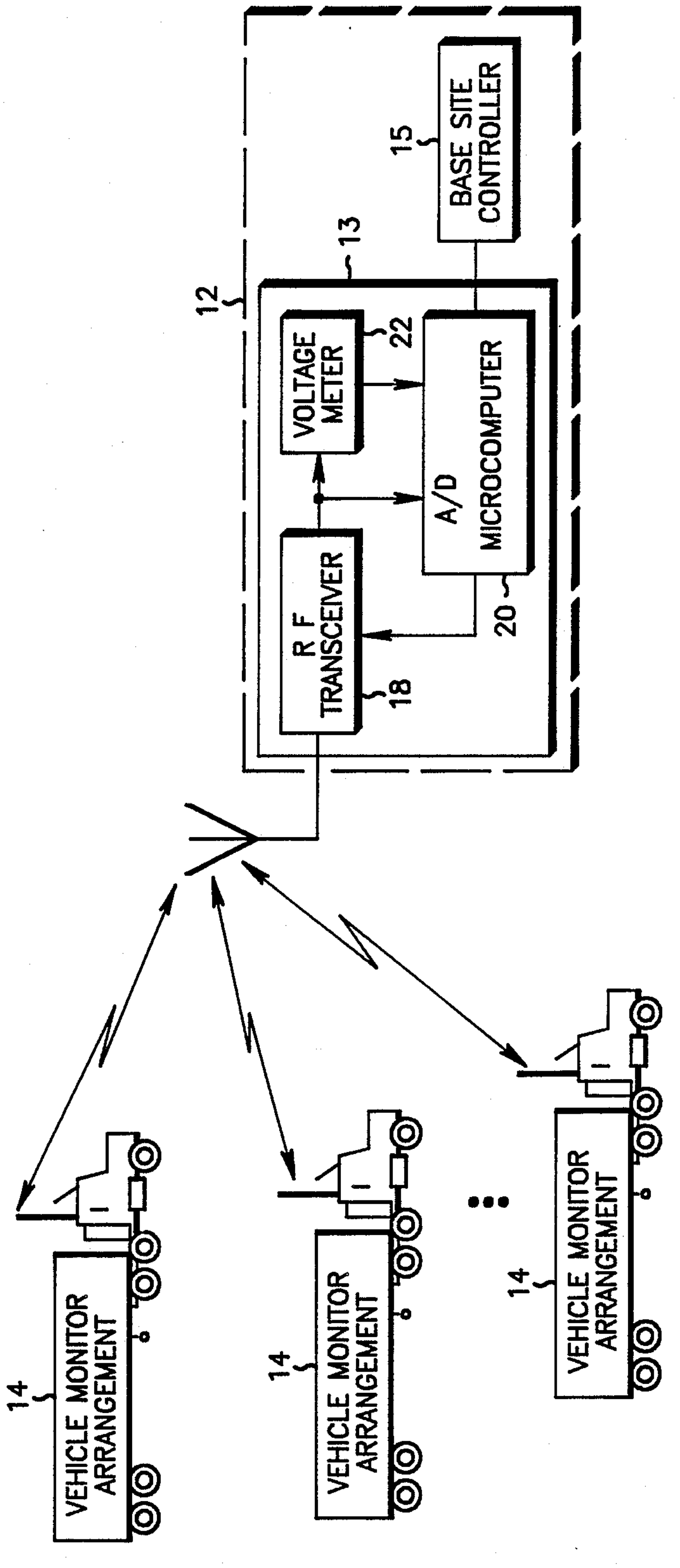
FIG. 1 is a diagram of a vehicle monitoring system, according to the present invention.

Such an application is shown in FIG. 1 where a plurality of trucks, each having a mobile radio unit 14 installed therein, are depicted in communication with a base station 12 on a single RF communications channel. Each truck includes a vehicle monitoring arrangement as described in "Vehicle Monitoring Arrangement and System", co-pending patent application Ser. No. 54,471, filed on May 26, 1987, assigned to the assignee of the present invention and incorporated herein by reference.

The base station 12 includes a base RF unit 13 and a base site controller 15, both of which are used for controlling the transmissions to and from the base station 12 on the single communications channel.

The base site controller 15 may be implemented using an IBM Personal Computer (IBM-PC). The base RF unit 13 may be employed using a RF transceiver 18, such as the Mostar brand radio available from Motorola, Inc., a microcomputer 20, such as a MC68HCll also available from Motorola, Inc., and a conventional voltage meter 22.

The above described application for which this system is designed entails the trucks entering and exiting the RF range of a single channel communication system on a random basis, i.e., at any given time any number of trucks may be within RF range of the base station 12. The system employs a strategy for promptly identifying which trucks are within RF range of the base station 12 without tying up the single channel. The base station must not tie-up the single channel while identifying such trucks, because subsequent communication between the base station and the trucks already within RF range is also required on the same channel.

Figure 2A:
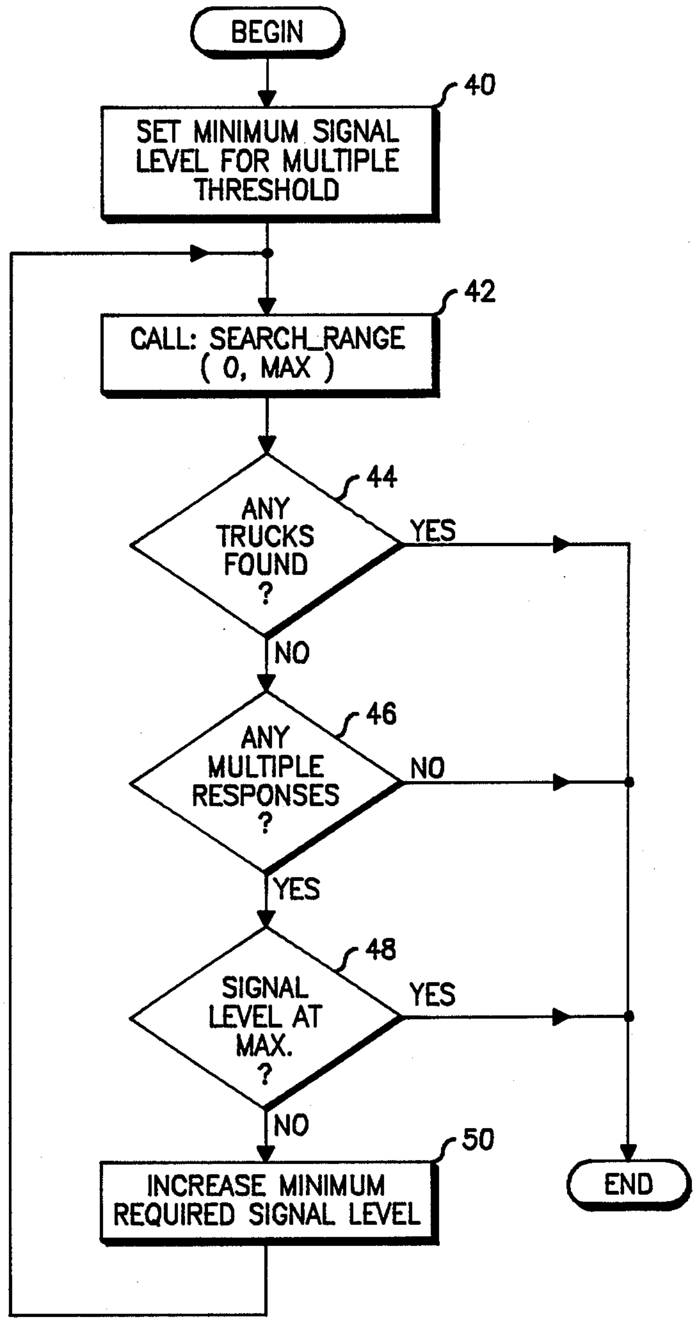
FIGS. 2*a* and 2*b* comprise a flowchart depicting a set of steps which may be used by a microprocessor to implement a vehicle identification method for the base station in accordance with the present invention.
Figure 2B:
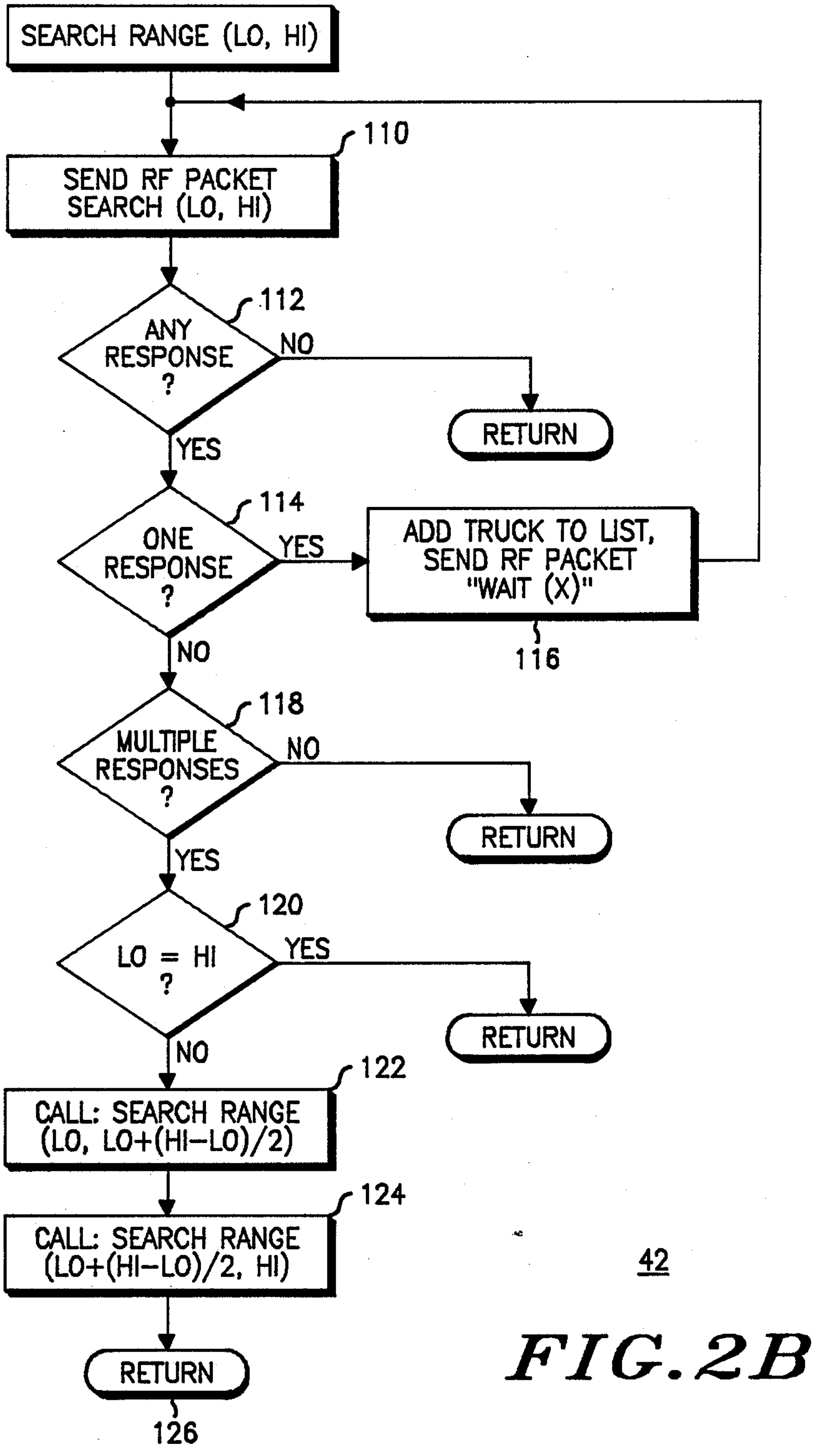

In accordance with the present invention, an identification strategy, depicted in flowchart form, is provided in FIGS. 2*a* and 2*b*. The steps of the flowchart in FIGS. 2*a* and 2*b* may be implemented by the microcomputer 20 within the base RF unit 13. The strategy may be performed by the microcomputer on a periodic basis, e.g. once per minute, to allow the base station to communicate with the vehicles over the single communication channel in a normal data communication mode. Thus, each time it is desired to identify the vehicles within RF range of the base station, the steps shown in the flowchart of FIGS. 2*a* and 2*b* are executed.

The flowchart begins at block 40 of FIG. 2*a* where a minimum signal level threshold (hereinafter referred to as the Multiple threshold) is set for the received signal in the RF transceiver 18 such that signals comprising "multiple responses" which are received by the base RF unit 13 must have a minimum signal strength to be acknowledged (recognized) by the base station 12. (Such signals are further discussed below.) The voltage meter 22 in the base RF unit 13 is used to measure the received signal at the output of the RF transceiver 18.

At block 42, a subroutine entitled "SRCHRNG" (search-range) is called which locates all vehicles (trucks) within RF range of the base station 12. SRCHRNG is described in FIG. 2*b*, in flowchart form, and requires the passing thereto of two parameters: "LO" and "HI" (LO, HI). LO and HI both correspond to a range of vehicle identification (ID) numbers (each vehicle has a unique preassigned vehicle ID number). By passing LO and HI parameters to SRCHRNG, the range of the vehicle ID search is designated. For example, if the desired vehicle ID range to be searched is between 10 and 50, SRCHRNG is called with parameters (10, 50). At block 42, the parameters are always (0, MAX), where MAX is a number equal to or greater than the greatest vehicle ID number.

After SRCHRNG is finished identifying the LO-HI range vehicles within RF range of the base station, flow proceeds to block 44 where a test is performed to determine if any vehicles where identified. If so, the ID strategy is complete. If not, flow proceeds to block 46 where a test is performed to determine if there were multiple responses to the searching, i.e., if more than one vehicle appeared to have responded to the searching. If not, the ID strategy is complete.

If it appeared as though there were apparent multiple responses, interferring radio frequency noise may have been the cause. More specifically, the interferring radio frequency noise may have caused an intelligible vehicle response appear unintelligible. Consequently, the Multiple threshold is increased in the RF transceiver 18 in order to overcome any possible interferring noise that may be causing an intelligible vehicle response to appear unintelligible, depicted at block 50.

At block 48, a test is performed to determine if the Multiple threshold has been increased to the maximum allowable level. If it has, the responses from mobiles have not been distinguished from the interferring noise, and it is persumed that no mobiles are present. Thus, the ID strategy is complete. Preferably, the minumum signal level of the Multiple threshold is 3.5 v, the maximum signal level is 5.0 v, and 6 steps of 250 mv are allowed therebetween.

From block 50, flow returna to block 42 where another search is executed at the higher Multiple threshold.

Figure 3:
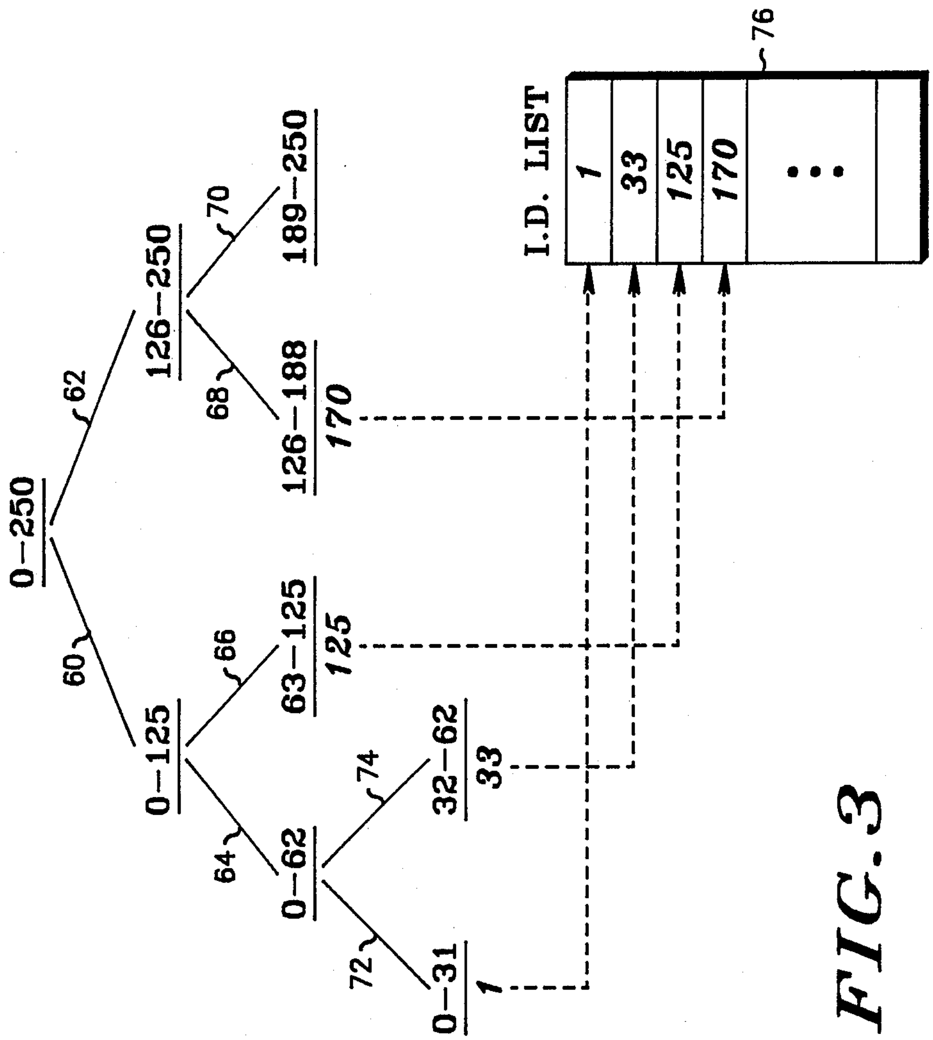
FIG. 3 is a diagram illustrating the recursive operation of the steps shown in FIG. 2*b*.

In FIG. 2*b*, the subroutine SRCHRNG (block 42 of FIG. 2*a*) is shown in expanded form. As previously discussed, SRCHRNG locates any and all vehicles within communication range of the base station. Once SRCHRNG has been initially called, SRCHRNG is subsequently called in a recursive manner. Before proceeding to describe SRCHRNG in detail, FIG. 3 is discussed to help illustrate the recursive operation of SRCHRNG. In FIG. 3, a binary-tree diagram is shown having 8 branches (60, 62, 64, 66, 68, 70, 72 and 74). Each of the 8 branches illustrates a search performed by SRCHRNG for a particular range of vehicles. Initially, the range of vehicles to be searched as indicated by their respective vehicle ID numbers, are 0–250 (as shown at the root of the tree diagram). Below each terminating branch (66, 68, 70, 72, and 74) is a vehicle ID number (1, 33, 125 and 170; all italicized) corresponding to a vehicle within communction range of the base station. The branches are contiguously traversed by the recursive operation of SRCHRNG in order to efficiently identify each of the vehicles within RF range of the base station. An example of the vehicle locating strategy for identifying these units is described below with discussion of SRCHRNG according to the steps depicted in FIG. 2*b*.

SRCHRNG At lock 110 of FIG. 2*b* with an RF transmission of a "LO, HI" RANGE packet (illustrated in FIG. 5) by the base station 12. The RANGE packet minimally includes the two parameters, LO and HI, which are used to request a response from those mobiles having an ID number between or to equal those ID numbers represented by LO and HI. In FIG. 3, this is illustrated at the root of the tree diagram where the initial range is 0–250. The range parameters are set initially at block 42 of FIG. 2*a*.

At block 112, a test is performed to determine if there have been responses from any of the vehicles having ID numbers within this 0–250 range. If not, the search is complete since no vehicles have been found, and the subroutine is returned from.

If there were responses within this ID range, flow proceeds to block 114 where a test is performed to determine if only one response was detected. A single response is detected when the signal strength of the response exceeds an In-range threshold level, and the response is decodable. The In-range threshold level is a non-varying level which is set equal to the minimal signal level of the Multiple threshold.

If only one response was detected, the ID number of the responding vehicle is added to a vehicle ID list 76 (FIG. 3), depicted at block 116. The ID list 76 is used for subsequent communication as may be required between the base station and those vehicles represented in the ID list. Also at block 116, a WAIT packet (illustrated as 254 in FIG. 5) is sent to the responding vehicle to instruct the vehicle not to respond to subsequent range packets for a predetermined period of time. The WAIT packet is discussed in more detail with FIG. 4.

If there was not a decodable response from a vehicle, flow proceeds to block 118 where a test is performed to determine if there were multiple responses. A multiple response is detected when (a) the received signal strength is greater than the minimum required signal level, and (b) the response cannot be decoded.

If neither multiple responses nor a single response was received, flow returns from the subroutine SRCHRNG, and the search process is complete. If multiple responses were received, flow then proceeds to block 120 where a test is performed to determine if the search range can be "narrowed" such that fewer vehicle responses are requested by a subsequent execution of the SRCHRNG subroutine, discussed in more detail below. If the LO parameter does not equal the HI parameter the search range can be narrowed, and flow proceeds to block 122. Otherwise, the subroutine is returned from.

In the example depicted in FIG. 3, the initial range searched was 0–250. In response to the search performed at block 110, there would be multiple responses since vehicles with ID numbers 1, 33, 125 and 170 have not yet been identified by the base station.

At block 122, SRCHRNG is called recursively with its parameters "narrowed" such that only the lower half of the previous range is searched, i.e., the new HI parameter becomes LO+(HI-LO)2. In the example of FIG. 3, the previous range, 0–250, would be narrowed to 0–125 as indicated by branch 60 in FIG. 3. It should be noted that the parameters LO and HI are passed via internal microcomputer registers which are popped onto the microcomputer stack when SRCHRNG is called and pulled off the stack when SRCHRNG is returned from. Hence, the recursion technique discussed herein requires no external queuing of LO and HI parameters as the recursive subroutine becomes nested and unnested.

From block 122, the steps of FIG. 2*b* begin again with a RANGE packet transmission for the new, narrowed search range parameters at block 110.

In the example of FIG. 3, the transmission in effect requests responses from any mobile having an ID number from 0–125. Continuing through to block 118, multiple responses are detected by the base station and flow proceeds once again to block 122 where the search range becomes narrowed again. This time the range is reduced to 0–62 (rounding down 125/2). Multiple responses are detected from this search, vehicle ID numbers 1 and 33, and yet another recursive call is executed at block 122. Narrowing the range from 0–31, only one response is detected, from vehicle ID number 1. Hence, flow proceeds from block 114 to block 116 where ID number 1 is added to the ID list 76 (FIG. 3). Also at block 116 the previously discussed WAIT packet is transmitted to "shut-up" the vehicle with the detected ID number, i.e., instruct the mobile radio unit within the vehicle not to respond to future Range packets for a predetermined period of time.

From block 116, flow proceeds to blook 110 where the 0–31 searoh is repeated. The repetition provides for the detection of additional vehicle responses which may have been delayed or lost through FM capture via the unit which was detected. For example, presume two vehicles having IDs in the designated range are present when the RANGE packet is transmitted, and each vehicle responds but only the response from the one with the stronger RF signal, with respect to the base station, is captured by the base station; then, without the repeated search, the base station would otherwise assume only one vehicle was present. In the present example, no such problem exists. Hence, flow proceeds through block 118 where SRCHRNG is returned from for the first time in this example. As previously noted, such returning will change the registers containing LO and HI to the previous parameters, i.e., (0, 62) as indicated in FIG. 3 at the joining node of branches 72 and 74.

As a result of the "return", from block 122 flow proceeds to block 124 where SRCHRNG is called with its present parameters narrowed such that only the higher half is searched, i.e., the new LO parameter becomes LO+(HI-LO)/2. In the example, its present parameters are 0–62 and its higher half is from 32–62. Thus, SRCHRNG is called with the LO parameter equal to 32 and the HI parameter equal to 62.

In response to this search, vehicle ID number 33 is identified and added to the ID list 76 (FIG. 3). After the repeated search (from block 116 to block 110), flow proceeds through block 118 where SRCHRNG is returned from. Flow then proceeds to block 126 where another "return" is executed. At this latter return, the stack changes the registers containing (LO, HI) to (0, 125), as indicated by the node joining branches 64 and 66 in FIG. 3, and flow proceeds to block 124 where SRCHRNG is called with its present parameters narrowed again. In the example, its present parameters are 0–125 and its higher half is from 63–125. Thus, SRCHRNG is called with the LO parameter equal to 63 and the HI parameter equal to 125.

In response to this search, vehicle ID number 125 is identified and added to the ID list 76. After the repeated search (from block 116 to block 110), flow proceeds through block 118, SRCHRNG is returned from, and flow proceeds to block 126 where another "return" is executed. At this latter return, the stack changes the registers containing (LO, HI) to (0, 250), as indicated by the node joining branches 64 and 66 in FIG. 3, and flow proceeds to block 124 where SRCHRNG is called with its present parameters narrowed again. In the example, its present parameters are 0–250 and its higher half is from 126–250. Thus, SRCHRNG is called with the LO parameter equal to 126 and the HI parameter equal to 250. In this example, when the vehicle with ID code 170 responds to this search, presume that interferring noise is present such that its ID code cannot be decoded by the base station. In this situation, the response is considered a multiple response (block 118), and flow proceeds through block 118 to block 122 where SRCHRNG is called with its present parameters narrowed such that only the lower half of the range is searched. In the L example, its present parameters are (126, 250), and its lower half is from 126–188. Thus, SRCHRNG is called with the LO parameter equal to 126 and the HI parameter equal to 188.

In response to this search, vehicle ID number 170 is identified and added to the ID list 76 (FIG. 3). After the repeated search (from block 116 to block 110), flow proceeds through block 118, SRCHRNG is returned from, and flow proceeds to block 124 where SRCHRNG is called with its present parameters narrowed such that only the upper half of the range is searched. Its present parameters are now (126, 250), and its upper half is from 189–250. Thus, SRCHRNG is called with the LO parameter equal to 189 and the HI parameter equal to 250.

There are no responses to this search. Thus, flow proceeds through block 112, to block 126 where SRCHRNG is completely unnested and returned from. The result of the search is the ID list 76 of FIG. 3 containing vehicle ID numbers 1, 33, 125 and 170. This list is then used by the base station to select vehicles for normal communication.

A particular advantage of the search technique described in FIGS. *2a* and *2b* is its ability to quickly identify vehicles in the presence of varying levels of radio frequency noise. For example, if the search range is narrowed to a single ID, and a multiple response is received, there must have been interference present. In which case, the Multiple threshold is raised, and the process, as described in FIGS. *2a* and *2b*, is continued. If the interference continues, the multiple threshold is raised until the interferring noise no longer appears above the Multiple threshold. Thus, any vehicles transmitting at levels higher than the interferring noise can still be found.

Another advantage of the search technique described in FIGS. *2a* and *2b* is that if only one vehicle is within RF range of the base station, then SRCHRNG is called only once in order to identify the vehicle. This greatly reduces the processing time required by the microcomputer 20 (FIG. 1), and minimizes usage of the base station RF unit for such searching; thereby freeing up the base station RF unit for data communication with the vehicles identified within RF range of the base station.

Figure 4:
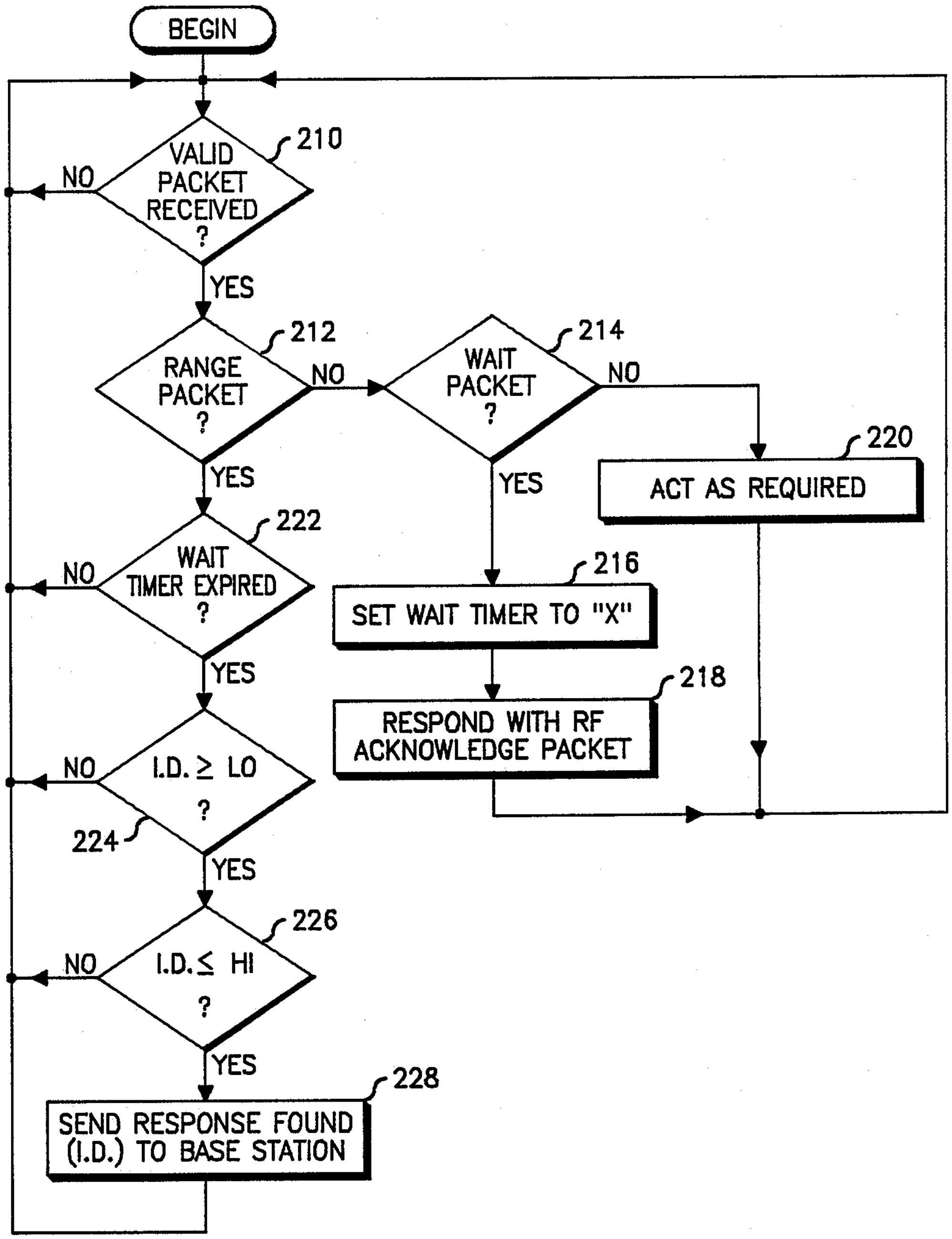
FIG. 4 is a flowchart depicting a set of steps which may be used to implement the operation, responsive to the vehicle identification method for the base station, of the mobile radio units in accordance with the present invention.

FIG. 4 illustrates a set of steps, in flowchart form, which may be employed to implement the desired operation of the RF mobile unit in each vehicle in conjunction with the steps of FIGS. *2a* and *2b* for the base station. The flowchart begins at block 210 where a test is performed to determine if a valid packet has been received. If so, flow proceeds to block 212 where a test is performed to determine if the packet is a RANGE packet. If a valid packet was not received, flow returns to block 210.

If the valid packet was not a RANGE packet, flow proceeds to block 214 to determine if the packet is a WAIT packet. If the received packet is a WAIT packet, a timer is set to count down from "X" to zero, depicted at block 216. The wait timer may be implemented by using a real time clock or by using conventional software timing means. In either case, the wait timer begins timing for a predetermined interval once the WAIT packet is received from the base station.

The mobile unit then responds to the received WAIT packet with an ACK (acknowledge) packet, at block 218, to indicate to the base station that the WAIT packet has been received. From block 218, flow returns to block 210.

If the received packet was neither a RANGE packet nor a WAIT packet, the received packet is decoded to determine the specific instructions the base station is sending to the mobile unit through the received packet, depicted at block 220.

As previously discussed in connection with block 116 of FIG. *2b*, once the base station has identified a vehicle, the corresponding vehicle ID number is added to the ID list 76 (FIG. 3), and a WAIT packet is transmitted to the identified vehicle. The WAIT packet instructs the identified vehicle not to respond to range packets for a predetermined period of time, the period being indicated by the "X" parameter transmitted in the WAIT packet.

The "X" parameter is generally set equal to at least several minutes. This allows the base station to finish searching and identifying the remaining vehicles within RF range of the base station and avoids overloading the RF channel with redundant search activity. Where several vehicles enter the RF range of the base station simultaneously, a complete search and identification requires only about 5 seconds until each vehicle ID has been added to the ID list.

If the received packet is a RANGE packet, flow proceeds from block 212 to block 222 where a test is performed to determine if the wait timer has expired. It should be noted that the wait timer may have been previously set in response to the reception of a WAIT packet. If the timer has not expired, flow returns to block 210. Otherwise, flow proceeds to blocks 224 and 226 to determine if the vehicle ID falls within the range designated by the RANGE packet, i.e., if the vehicle ID is between LO and HI.

If the vehicle ID does not fall within the range designated by the RANGE packet, flow returns to block 210. If the vehicle ID falls within the range, the vehicle responds by transmitting a FOUND packet (FIG. 5), as indicated at block 228. From block 228 flow returns to block 210.

Accordingly, by setting "X" to at least the minimum time required for the base station to complete the search identification strategy of FIGS. *2a* and *2b*, each vehicle within RF range will promptly be identified but never "shut-up" from subsequent data communication with the base station, and only "shut-up" from responding to RANGE packets for a minimal length of time.

Figure 5:
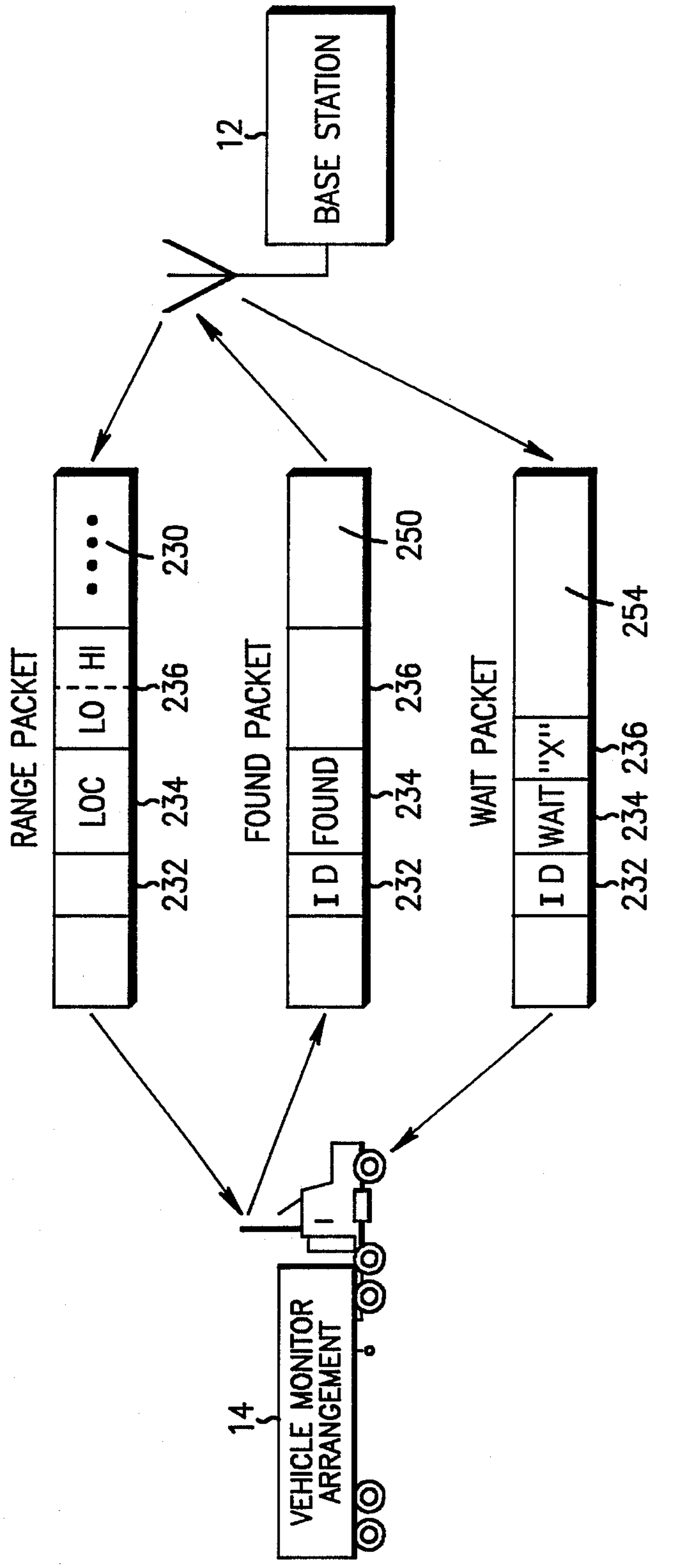
FIG. 5 is a diagram depicting three information packets which are communicated between the base station and the respective mobile radio units in the vehicles.

FIG. 5 illustrates the primary information packets which are communicated between the base station and the vehicle. (The ACK packet is not shown.) Each packet contains the fields: vehicle ID field 232, command field 234, and data field 236. The RANGE packet, depicted as 230, specifically contains a LOCATE command in the command field 234. The LOCATE command is used to instruct the vehicle to compare its ID to the given range as indicated in the RANGE packet. Contained in the data field 236 are the LO and HI parameters which, as previously discussed, are used to designate the range of vehicles being searched. The vehicle ID field contains no pertinent information with the transmission of the RANGE packet. The LOCATE command is used at block 212 to determine if the received packet is a RANGE packet.

The FOUND packet, depicted as 250, contains the vehicle ID of the responding vehicle in the vehicle ID field. A FOUND command is provided in the command field 234 as an acknowledgement to the base station that the vehicle has been found. The data field contains no pertinent information with the transmission of the FOUND packet.

The WAIT packet, depicted as 254, contains the vehicle ID of the vehicle instructed to "shut-up" in the vehicle ID field. A WAIT command is provided in the command field 234 to instruct the vehicle as to the type of action which is required, namely, to "shut-up". The data field contains the "X" parameter designating the length of time which the vehicle should keep its transmitter off (shut-up).

The present invention therefore provides a communication system for a vehicle monitoring system having a base station which readily locates vehicles entering its RF range. By developing an efficient communication methodology which may be employed on a single communication channel, the system quickly locates such vehicles while overcoming problems such as RF capture contention, noise interference and vehicle transmission collision by responding vehicles.

What is claimed is:

1. In a communication system having a communication channel for transmitting data between a base station and a plurality of mobile units, wherein each unit has a unique identification (ID) code and wherein transmissions from each unit to the base station include the unit's ID code, a method for identifying which units are within communication proximity of the base station, comprising the steps of:

(a) transmitting a range message, including a low ID code parameter and a high ID code parameter, from the base station over the channel to elicit a response from any mobile units having an ID code between said low and high ID code parameters;

(b) determining whether any of said units transmitted a message in response to said range message; and (c) storing, at the base unit and responsive to said transmission by any of said units, a signal representative of the respective ID code parameter assigned to such transmitting units.

2. A method for identifying which units are within communication proximity of the base station, according to claim 1, wherein step (b) further includes the step of setting a minimum signal level at the base station such that transmission levels from said units must exceed said minimum signal level in order to be recognized by said base station.

3. A method for identifying which units are within communication proximity of the base station, according to claim 2, wherein step (b) further includes the steps of determining whether the transmission levels received by said base station exceeded said minimum signal level and, if so, whether such transmissions included intelligible ID codes.

4. A method for identifying which units are within communication proximity of the base station, according to claim 1, wherein step (b) further includes the step of detecting when a multiple response is received by: setting a minimum signal level at the base station such that the transmission level of the received response must exceed said minimum signal level, and determining that the received response is unintelligible.

5. A method for identifying which units are within communication proximity of the base station, according to claim 4, wherein step (b) further includes the step of incrementing said minimum signal level and repeating steps (a), (b) and (c) after a multiple response is received.

6. In a communication system having a communication channel for transmitting data between a base station and a plurality of mobile units, wherein each unit has a unique identification (ID) code and wherein transmissions from each unit to the base station include the unit's ID code, a method for identifying a plurality of units within communication proximity of the base station, comprising the steps of:

(a) transmitting a range message, including a low ID code parameter and a high ID code parameter to establish an ID range, from the base station over the channel to elicit a response from any of the mobile units having an ID code between said low and high parameters;

(b) determining if a plurality of units appeared to have responded to said range message;

(c) responsive to an apparent plurality of unit responses, transmitting another range message having an altered ID range in order to selectively limit the number of apparent responses from the units;

(d) determining when only one unit responds to the most recently transmitted range message;

(e) in the absence of only one unit responding to said most recently transmitted range message, repeating steps (c) and (d) until, at step (d), it is determined that only one unit has responded thereto;

(f) storing, at the base unit and responsive to transmission by said units, a signal representative of the respective ID code assigned to said one responding unit;

(g) repeating steps (c) through (f) until no more units respond to the most recently transmitted range message.

7. A method for identifying a plurality of units within communication proximity of the base station, according to claim 6, wherein step (d) further includes retransmitting the most recently transmitted range message to determine if there were responses from other units which were not detected on the previous transmission.

8. A method for identifying a plurality of units within communication proximity of the base station, according to claim 6, wherein step (c) further includes changing the ID range such that it is proportionally narrowed from the previous ID range.

9. A method for identifying a plurality of units within communication proximity of the base station, according to claim 6, wherein step (c) further includes changing the ID range such that the changed ID range does not overlap any previous ID range whose transmission resulted in less than two responses from units.

10. In a RF communication system having a communication channel for transmitting data between a base station and a plurality of mobile radio units, wherein each radio unit has a unique identification (ID) code, a method for a radio unit to respond to a first transmission from the base station, which transmission includes data to selectively elicit a mobile radio unit response, comprising the steps of:

(a) determining whether the first transmission includes data which specifies the particular ID code parameter of the radio unit;

(b) in response to the first transmission including data which specifies the particular ID code parameter of the radio unit, transmitting a message from the radio unit to the base station which includes the particular ID code parameter of the radio unit and a signal indicative that the radio unit has determined that its particular ID code parameter was specified by the first transmission;

(c) monitoring the channel for a second transmission from the base station to the unit, which transmission includes an instruction not to respond for a predetermined time period; and (d) in response to said second base station transmission, setting a timer to time the predetermined time period such that the unit will not respond to additional first transmissions from the base station until the time period lapses.

11. In a RF communication system having a RF communcation channel for transmitting data between a base station and a plurality of mobile radio units, wherein each radio unit has a unique identification (ID) code and wherein transmissions from each radio unit to the base station include the radio unit's ID code, a method of communication to identify which radio units are within RF communication proximity of the base station, comprising the steps of:

(a) transmitting a range message, including a low ID code parameter and a high ID code parameter, from the base station over the channel to elicit a response from at least one of the mobile radio units having an ID code between said low and high parameters;

(b) determining, at a selected radio unit, whether the range message is indicative of the ID code parameter of the selected radio unit;

(c) in response to the range message including data which is indicative of the ID code parameter of the selected radio unit, transmitting a found message from the selected radio unit to the base station which includes the ID code parameter of the selected radio unit and which includes a signal indicative that the radio unit has determined that its ID code parameter is indicated by the range message, and monitoring the channel for a second transmission from the base station;

(d) determining, at the base station, whether any radio units transmitted said found message in response to said range message;

(e) storing, at the base unit and responsive to transmission by said radio units, a signal representative of the respective ID code assigned to such transmitting radio units; and (f) in response to the selected radio unit transmitting said found message, transmitting a message top said selected radio unit instructing said selected radio unit not to respond for a predetermined time period to allow the base station sufficient time to transmit additional range messages over said channel in order to identify additional radio units within RF proximity of the base station.

12. In a communication system having a communication channel for transmitting data between a base station and a plurality of mobile units, wherein each unit has a unique identification (ID) code and wherein transmissions from each unit to the base station include the unit's ID code, an arrangement for identifying which units are within communication proximity of the base station, comprising:

(a) means for transmitting a range message, including a low ID code parameter and a high ID code parameter, from the base station over the channel to elicit a response from any mobile units having an ID code between said low and high ID code parameters;

(b) means for determining whether any of said units transmitted a message in response to said range message; and (c) means for storing, at the base unit and responsive to said transmission by any of said units, a signal representative of the respective ID code parameter assigned to such transmitting units.

13. An arrangement for identifying which units are within communication proximity of the base station, according to claim 12, wherein said means for determining further includes means for setting a minimum signal level at the base station such that transmission levels from said units must exceed said minimum signal level in order to be recognized by said base station.

14. An arrangement for identifying which units are within communication proximity of the base station, according to claim 13, wherein said means for determining further includes means for determining whether the transmission levels received by said base station exceeded said minimum signal level and, if so, whether such transmissions included intelligible ID codes.

15. An arrangement for identifying which units are within communication proximity of the base station, according to claim 12, wherein said means for determining further includes means for detecting when a multiple response is received by setting a minimum signal level at the base station such that the transmission level of the received response must exceed said minimum signal level, and by determining that the received response is unintelligible.

16. In a RF communication system having a communication channel for transmitting data between a base station and a plurality of mobile radio units, wherein each radio unit has a unique identification (ID) code, an arrangement for a radio unit to respond to a first transmission from the base station, which transmission includes data to selectively elicit a mobile radio unit response, comprising:

(a) means for determining whether the first transmission includes data which specifies the particular ID code parameter of the radio unit;

(b) means for in response to the first transmission including data which specifies the particular ID code parameter of the radio unit, transmitting a message from the radio unit to the base station which includes the particular ID code parameter of the radio unit and a signal indicative that the radio unit has determined that its particular ID code parameter was specified by the first transmission;

(c) means for monitoring the channel for a second transmission from the base station to the unit, which transmission includes an instruction not to respond for a predetermined time period;

(d) a timer for timing the predetermined time period; and (e) means for setting, in response to said second base station transmission, the timer to time the predetermined time period such that the unit will not respond to additional first transmissions from the base station until the time period lapses.

* * * * *